(12) United States Patent
Ould Abdellahi

(10) Patent No.: US 8,146,410 B2
(45) Date of Patent: Apr. 3, 2012

(54) ENGINE TEST BED SUPERVISION SYSTEM INDEPENDENT OF THE ENGINE TEST BED TYPE

(75) Inventor: Mohamed Ould Abdellahi, Courbevoie (FR)

(73) Assignee: IFP, Cedex (FR)

( * ) Notice: Subject to any disclaimer, the term of this patent is extended or adjusted under 35 U.S.C. 154(b) by 407 days.

(21) Appl. No.: 12/442,709

(22) PCT Filed: Sep. 17, 2007

(86) PCT No.: PCT/FR2007/001508
§ 371 (c)(1),
(2), (4) Date: Mar. 25, 2009

(87) PCT Pub. No.: WO2008/037868
PCT Pub. Date: Apr. 3, 2008

(65) Prior Publication Data
US 2010/0005874 A1    Jan. 14, 2010

(30) Foreign Application Priority Data
Sep. 27, 2006  (FR) ...................................... 06 08543

(51) Int. Cl.
*G01M 15/00*  (2006.01)
(52) U.S. Cl. .................................. 73/116.02; 73/118.02
(58) Field of Classification Search ............... 73/116.01, 73/116.02, 118.02
See application file for complete search history.

(56) References Cited

U.S. PATENT DOCUMENTS

| | | | |
|---|---|---|---|
| 6,249,882 B1 * | 6/2001 | Testardi | 714/38.14 |
| 6,401,220 B1 | 6/2002 | Grey et al. | |
| 6,507,842 B1 | 1/2003 | Grey et al. | |
| 7,653,476 B2 * | 1/2010 | To et al. | 701/104 |
| 2008/0009998 A1 * | 1/2008 | To et al. | 701/102 |

FOREIGN PATENT DOCUMENTS

DE   103 25 349 A1   1/2005
WO   WO 2005116605 A1 * 12/2005

OTHER PUBLICATIONS

Jean-Francois Peyrucat: Mesures, No. 733, Mars 2001 (Mar. 2001), pp. 82-85, XP002435704.

* cited by examiner

*Primary Examiner* — Freddie Kirkland, III
(74) *Attorney, Agent, or Firm* — Antonelli, Terry, Stout & Kraus, LLP.

(57) ABSTRACT

A system is disclosed for real-time supervision of engine test beds independent of the engine test bed. This supervision system comprises a file describing equipments and drivers associated with engine test beds, and a set of software drivers for controlling engine test bed equipments. These drivers are independent of the software operating environment and of the computer platform of the system. This system also comprises a real-time supervision software for reading the information from the description file and loading the required drivers so that test configurations can be carried out in real time. These configurations come from a test configuration editor specific to the system and are independent of the engine test bed. An application of the invention is for studying of thermal engines or electric motors on test beds.

28 Claims, 2 Drawing Sheets

PRIOR ART

ENGINE TEST BED SUPERVISION SYSTEM INDEPENDENT OF THE ENGINE TEST BED TYPE

BACKGROUND OF THE INVENTION

1. Field of the Invention

The present invention relates to a system intended for real-time supervision of engine test beds used to design engine tests totally independently of the engine test bed likely to accommodate it.

2. Description of the Prior Art

The study of thermal engines or electric motors and of the many parameters that influence their behavior, as well as the compliance with certain standards (anti-pollution standards for example), require engine tests on study or certification benches. Owing to the constantly increasing number of engine control parameters, via the appearance of new technologies, engine parameters are adjusted during several engine calibration phases. In order to reduce the time required to develop an engine, the test centers have to optimize their working methodologies and their equipments.

The studies performed on engine test beds allow conducting a complete study of the operation of internal-combustion engines by studying the influence of the various adjustable parameters on the operation of the engine.

An engine test bed is associated with a supervision system (acquisition and control system) whose software organization allows designing and driving such engine tests. FIG. 1 illustrates a conventional hardware architecture associated with an engine test bed supervision system. The engine test bed (BEM) includes the engine (MOT) and of the following elements allowing driving the engine or to analyze the operation thereof:

- brake or generator (FG)
- automaton (AUT)
- gas analysis cabinet (BAG)
- smoke meter (AF)
- fuel consumption balance (BCC).

An engine test bed supervision software (SOFTW) is generally organized on the basis of a "test configuration" describing the acquisition, control and sequence definition conditions of an engine test considered.

A test configuration can be conducted by the user by means of a "test configuration editor" specific to the supervision software.

This test configuration can then be carried out by the proper supervision software. The supervision software is then put in charge of performing the required data acquisitions and real-time evaluation of the required quantities, and of controlling the resulting set points while guaranteeing safety of the experimentation conditions (permanent safety monitoring). Definition of the sequences of these operations is carried out by the supervision software by means of the real-time core of the computer platform that controls the electronic I/O and digital communication cards via the associated drivers.

According to the conventional organization, each test configuration depends on the specific equipments of each engine test bed. When a test configuration has been designed on the basis of the equipments of an engine test bed No. 1, this test configuration is not directly portable to engine test bed No. 2 because of the heterogeneity of the costly equipments notably dedicated to the brake regulation, gas analysis, fumes analysis and fuel consumption measurement functions. This portability can however be achieved by adapting the test configuration achieved on engine test bed No. 1 to the equipments of engine test bed No. 2 through the modification of the declaration and identification of the I/O specific to the equipments of engine test bed No. 2. The dependency of the list of the I/O of the engine test bed equipments is direct with the test configuration declaration. The necessity of modifying these declarations in the case of porting this test configuration to another engine test bed provided with different equipments is then inevitable.

Conventional supervision softwares only have drivers for controlling the engine test bed equipments. Now, each engine test bed equipment requires a parametrization suited to each test: selection of the measurements to be downloaded, definition of the measurement range, definition of the results format, etc. These operations are carried out by the user during a test configuration edition phase.

For a conventional supervision software (SOFTW), parametrization of a specific software driver is not integrated in the supervision software because this leads to modifying such a software every time the support of a new driver is added. This code is integrated specifically into each driver as shown in FIG. 3, which illustrates three types of equipment (EX, EY and EZ) having each their dedicated driver: PX, PY and PZ respectively. They communicate with a conventional supervision software (SOFTW) and its associated edition software (EDIT). Each driver thus has to integrate both the code of the edition functions of its specific parametrization (for EDIT) and the real-time management code (for SOFTW) of the equipment concerned.

This organization is all the more constraining since it requires managing within each driver the various compatible operating environments for the edition of its specific parameters. In general, the code of the Windows® (Microsoft, USA) dialog box is directly integrated within the driver.

Finally, these various engine test bed control systems do not allow to jointly perform engine control.

SUMMARY OF THE INVENTION

The present invention relates to a system (SS) for real-time acquisition and control of engine test beds, comprising a computer platform (PC), a software operating environment (OS) associated with a real-time module (MTR). This system comprises the following elements:

a file comprising descriptions (FD) of equipments and drivers associated with various engine test beds;

a set of software drivers (PL) for controlling engine test bed equipments, independent of the software operating environment (OS) and of the computer platform (PC);

an editor (EDIT) for test configurations defined by engine test acquisition and control conditions, said configurations being independent of said software drivers (PL) and of said engine test bed equipments;

a real-time supervision software (STR) for reading information from said description file (FD) and in charge of the real-time execution of the test configurations from the editor by carrying out loading of the required software drivers; and wherein the software drivers (PL) for controlling engine test bed equipments communicate in real time with said real-time supervision software (STR).

The real-time supervision system according to the invention comprises a software organization allowing perception of engine tests in total independence from the engine test bed (and therefore from the specific material equipments) likely to accommodate it, while integrating an engine control system.

According to an embodiment, a test configuration can be defined by means of generic functions of engine test beds.

Advantageously, the description file (FD) can be in XML (eXtensible Markup Language) format. Similarly, the test configuration editor (EDIT) can use XML format schemas.

According to another embodiment, the acquisition and control system (SS) also comprises an engine control system. This engine control system can comprise a module for automatic generation of an engine control driver for communicating an engine with the software (STR). According to the invention, this automatic engine control driver generation module can comprise the following elements:
- an engine control model generation module; and
- an engine control model compiler module;

In the embodiment comprising the use of a control driver, the computer platform (PC) can advantageously share its processor resource between engine test bed supervision tasks and control driver interpretation tasks.

BRIEF DESCRIPTION OF THE DRAWINGS

Other features and advantages of the real-time supervision system according to the invention will be clear from reading the description hereafter of non limitative embodiment examples, with reference to the accompanying figures wherein.

DETAILED DESCRIPTION OF THE INVENTION

Figure 1:
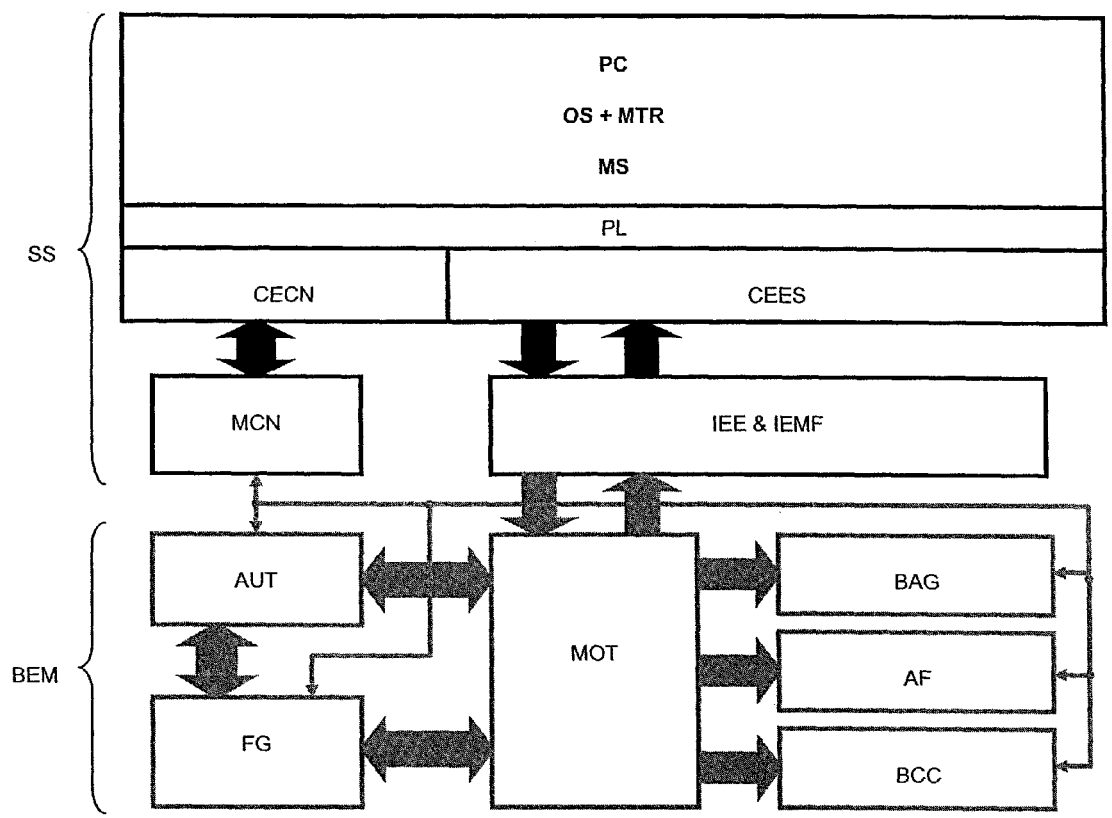
FIG. 1 illustrates a conventional hardware architecture associated with an engine test bed supervision system in accordance with the invention.

The real-time acquisition and control system (SS) for engine test beds according to the invention comprises the following elements (FIG. 1):
- a computer platform (PC);
- a software operating environment (OS) associated with a real-time module (MTR);
- an engine test bed supervision module (MS);
- a set of electronic cards (CEES) for acquisition and control of the inputs and outputs. These inputs and outputs are denoted by I/O;
- a set of electronic digital communication cards (CECN);
- a digital communication multiplexing set (MCN);
- a set of software drivers (PL) commonly referred to as drivers. They can be:
  - software drivers of the various electronic cards. In general, a driver is associated with each type of electronic card;
  - engine test bed equipment drivers. In general, these equipments are accessible via a dedicated digital communication with which an interpretation driver for the digital communication protocol selected is systematically associated;
  - electronic input conditioning and shaping interfaces (IEE) and electronic shaping interfaces and power stages for interfacing with the engine ignition and injection (IEMF).

The computer platform (PC) can be a PC compatible microcomputer. By way of example, the following PC type configuration can be used to implement the supervision system according to the invention:

Pentium 700 MHz processor
RAM memory: 128 Mo
hard disk: 20 Go or more
CD-ROM reader: 32× or more.

The real-time supervision system according to the invention comprises a set of software modules (supervision module (MS), real-time module (MTR), drivers (PL)) that can work under the following software operating environments (OS): Microsoft Windows NT4, 2000 and XP with their RTX extension from the Ardence Inc. Company (USA). Other operating environments can be considered by adapting the real-time module (MTR). It is a real-time executable that represents the heart of the supervision system (SS). It plays a central part in the real-time execution of the application, and it uses a driver interface for connecting to the drivers and to calling them at the right time in order to achieve acquisition and control of engine test beds. This module is launched in a transparent manner by the real-time supervision software (STR) of the supervision module (MS). It is this module that is in charge of the real-time execution of the applications. The real-time module fulfils the following functions:
- opening, identification and communication with the drivers;
- execution of the real-time applications; and
- communications with the real-time supervision software (STR).

The real-time engine test bed supervision system according to the invention is based on an "object programming" principle. This principle, developed in the field of computer programming, with notably the C++ language, is applied, according to the invention, to the field of engine test bed control systems. In other words, the principle of "object programming" is extended to the management of engine test bed supervision. According to the "object programming" principle, all the components of a computer program are encapsulated in objects. This notion of an object is essential in industrial programming because it allows each object to have a set of methods available allowing it to work. By principle, all the variables required for operation of an object are encapsulated within the class of the object considered so that no software function external to this object can have direct access to these protected variables. This can only be achieved by means of "methods" (software functions declared with the object class considered) associated with each object.

Within the context of engine test bed supervision systems, this principle allows constructing systems with a quite particular structure allowing engine tests to be designed in total independence from the engine test bed (and therefore from the specific material equipments) likely to accommodate it. An engine test bed becomes an "object".

Thus, the engine test bed supervision module (MS) comprises the following elements (FIG. 2):
- a test configuration editor (EDIT) that describes the acquisition, control and sequence definition conditions of an engine test considered;
- a real-time supervision software (STR);
- a file describing the composition of various engine test beds (FD).

The test configuration editor (EDIT) is a graphical executable that allows the user to write test configurations by means of menus, toolbars, graphical objects, etc. Preferably, this editor uses XML (eXtensible Markup Language) schemas. The configuration editor fulfils the following functions:
- loading the configuration of an engine test from the XML;
- a man/machine interface for the edition of configurations (applications that represent the tests to be carried out); and
- a man/machine interface for the graphical edition of display screens.

The real-time supervision software (STR) is an application that interacts with the user to execute an engine test. The user has menus and graphical windows at his or her disposal for controlling execution of the application. It is this application that launches, transparently with regard to the user, all the real-time applications required for this execution. This software allows the test bed operator to execute the applications configured by the editor. It fulfils the following functions:

a man/machine interface;
an interface with the real-time modules; and
configuration loading from the XML.

The engine test bed supervision module (MS) uses the only file (FD) that describes the composition of all the engine test beds to be used. These can be, for example, all the engine test beds of a company. The information described in this file and read by the real-time supervision software (STR), such as the list of the equipments of each engine test bed and the respective functions of each distinct equipment, is listed in the form of generic functions available on any test bed likely to accommodate such a supervision system. The description file (FD) can be in standard XML format to facilitate the management thereof.

Figure 2:
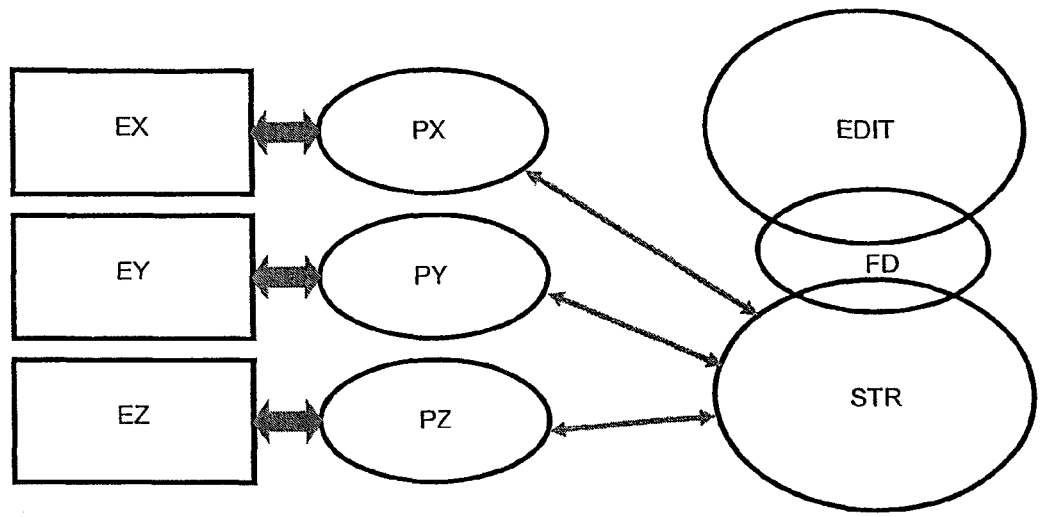
FIG. 2 illustrates the communications between the equipments and the edition and supervision softwares within the context of the supervision system according to the invention, via generic drivers.
Figure 3:
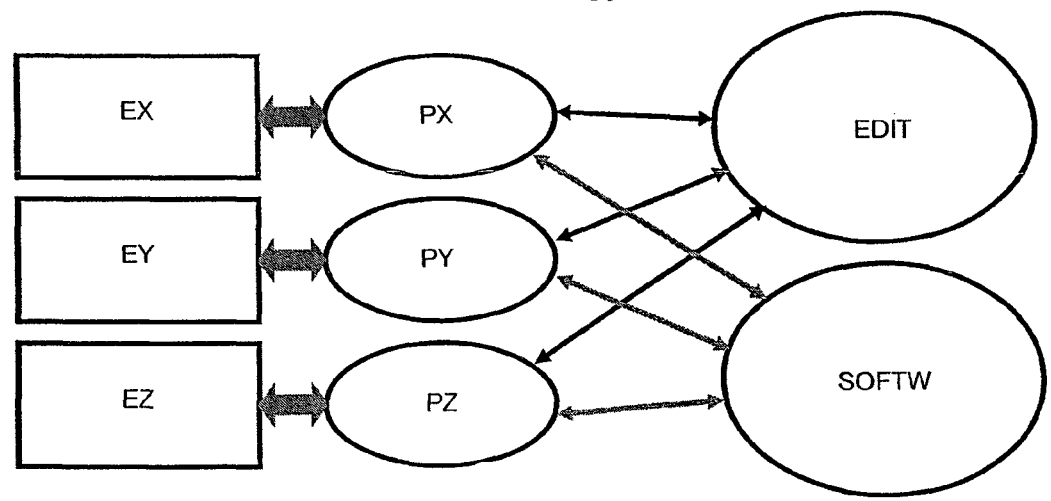
FIG. 3 illustrates the communications between the equipments and the edition and supervision softwares within the context of a conventional supervision system, via dedicated drivers.

FIG. 2 also illustrates the operation of such a supervision system. This figure can be compared with FIG. 3, which illustrates the operation of a conventional supervision system. It is understood that, in the conventional case, the edition of a particular configuration via editor EDIT is achieved according to the various drivers (PX, PY, PZ) of each equipment (EX, EY, EZ). On the other hand, according to the control system of our invention, edition of the configurations is totally independent of the drivers and the equipment type. Whether EX and PX or EY and PY, editing of the configuration remains unchanged.

The declaration of a test configuration via editor EDIT is thus made totally independent of the equipments of the engine test beds since it only requires the generic functions of an engine test bed intended to accommodate a supervision system (for example, fuel consumption measurement function, $CO_2$ measurement, fumes opacity measurement, etc.). The implicit loading of the driver of the required equipment is automated within the real-time supervision software (STR) on the execution of a test configuration, in view of the file (FD) describing the composition of various engine test beds.

The drivers (PL) of the real-time acquisition and control system (SS) are independent software modules allowing the possibilities of the system to be extended without modifying what already exists. They can be Windows® (Microsoft, USA) or RTX® executables. Windows® executables are necessarily asynchronous drivers, whereas RTX® executables can be of synchronous or asynchronous type. The asynchronous drivers are drivers that run asynchronously in relation to the kernel, and they do therefore not block the execution thereof. They can control hardware or not. The synchronous drivers are RTX® real-time executables that run synchronously with the kernel of the real-time system (SS) and they can control hardware or not.

The driver definition files are also preferably in XML format and they contain two types of data:

the public data that informs the real-time system (SS) about the channels, tables, maps and actions exported by the driver. This data describes for example the type of channels, the size of the tables, or how to edit or to display the driver's actions; and the private data is peculiar to each driver and it can be defined in schemes specific thereto. For example, the hexadecimal address of a map or the name of an equipment controlled by the driver are examples of such data.

These drivers then require an interface allowing communication between the processor and the drivers. This driver interface is based on the use of shared memories locked in memory, as well as synchronization objects (mutex, semaphores, events). It allows drivers and applications to exchange messages.

In order to best operate the structure of the engine test bed supervision module (MS), the engine test bed control system comprises drivers (PL) for controlling the engine test bed equipments without any parametrization code. The parametrization of an equipment is recorded within the description file (FD). No parametrization code is required within the drivers, which are then independent of the operating environment (e.g. Windows NT4 SP6, Windows XP, man/machine interface adaptation to the language of the country) and of the supervision platform. They are optimized with the only objective of controlling the real-time relationship of the equipment considered with the core of the supervision software STR.

Unlike conventional supervision softwares that only have the drivers for controlling engine test bed equipments, the supervision software STR can rely both on drivers to control the engine test bed equipments and on the file (FD) describing all the equipments of the various engine test beds.

This separation between the functions of the software drivers of material equipments and the configuration function of a test is fundamental because each engine test bed equipment requires a parametrization suited to each test: selection of the measurements to be downloaded, definition of the measurement range, results format definition, etc. These operations are carried out by the user during the stage of edition of a test configuration.

Embodiment with Engine Control

According to a particular embodiment of the engine test bed supervision system according to the invention, the latter also comprises an engine control system.

An engine test bed intended to receive a supervision system can fulfill the engine control function in different ways:

first this function is entrusted to a standard engine calculator that generally comes with the engine wiring of engine actuators and detection. This first solution does however not allow the user to access the parameters of the engine control integrated within this engine calculator;

the second solution replaces the standard engine calculator by a development engine calculator. This second solution is often conditioned by the engine study contract that authorizes or not to have such an equipment often provided by the customer (car or parts manufacturer). Although this solution allows a first access to the set points and to the main results of the engine control, it does not allow accessing of the automatic engine control strategies and it limits set points access to an interface (often a PC laptop) that cannot be electronically controlled;

the third solution replaces the standard engine calculator by a complete engine control development system such as the ACEbox® system developed by IFP (France). This third solution allows providing total access to the set points, to the main engine control results and to the automatic engine control strategies, with an entirely electronically controllable interface. Although this solution is completely suited to the development needs regarding engine control, it remains intended for applications that require a total CPU (Central Processing Unit) resource dedicated to the engine control.

The system according to the invention provides a fourth solution when the engine control requirements do not require a total CPU resource dedicated to the engine control. This system comprises, in place of a standard engine calculator, an engine control system integrated within the supervision system (SS).

According to this embodiment, the computer platform (PC) of the supervision system (SS) shares the resource of the platform processor (CPU) between two tasks. The first task is the supervision of the test bed. The second is the interpretation of a compiled code obtained from automatic modelling. This modelling is performed under a design platform for the simulation of multi-domain dynamic systems.

Such a platform can for example be the association of MATLAB® (MathWorks, USA) and of Simulink® (MathWorks, USA). MATLAB® is a software dedicated to the solution of signal processing or digital analysis problems. It allows carrying out matrix calculations and to display the results in graphical form. The formulation of the problems is akin to the mathematical formulation of the problems to be solved. Using the software involves launching command lines that can in most cases be akin to C programming. Simulink® is a design platform for the simulation of multidomain dynamic systems based on modelling. It provides an interactive graphical environment with a set of personalizable block libraries allowing designing with precision control/command, signal processing, communication systems and other time-variable systems. MATLAB® associated with Simulink®, by means of a command launched under MATLAB®, becomes a graphical tool that is very easy to use for process simulation (programming through copy/paste of functional blocks).

The engine test bed supervision system then comprises a module allowing automatic generation of an engine control driver. This module comprises:
a real-time engine control model generation module; and
a real-time engine control model compiler module.

Compilation provides the engine control driver: the use of these modules allows converting an engine control model into a driver for the supervisor, capable of replacing the intelligence (maps, algorithms, strategies) of the engine standard calculator.

The engine, and more particularly its wiring of the engine actuators and detectors, is in connection with the software (STR) via electronic I/O cards and electronic conditioning interfaces (galvanic insulation, measurement scaling, etc.) and power interfaces (ignition coils, injectors, solenoid valves, relays, etc.). This connection with the software (STR) is achieved under the Windows® operating environment via the specific compiled real-time driver. The latter then fulfils the engine control function.

The advantages of this solution are obvious since the number of central units on the engine test bed is optimized (1 PC=supervision+engine control). On the other hand, this centralizes the data within a single platform. It is no longer necessary to have communication electronics between the supervision computer platform and the engine control. All of the data collected by the user are available within a single machine and are therefore perfectly correlated.

This embodiment, described above on the basis of an engine control function, can be applied to any other function developed in form of a compilable MATLAB®/Simulink® model for the OS used. The example of a regulation of an equipment such as the engine brake is a perfect illustration thereof.

Operation of the Supervision System (SS)

The engine test bed (BEM) is associated with a control system (SS) generally in charge of the following operations:
data acquisition and engine set points control (BAG, AF, BCC);
control and regulation of the brake or of the generator (FG);
automation and definition of the engine test sequences; and
management and centralization of the engine test bed safeties (often under the direct responsibility of a dedicated automaton (AUT)).

These operations, shown by arrows in FIG. 1, are carried out as follows:
engine data acquisition is achieved by the input electronic conditioning and shaping interfaces (IEE) and by a digital communication with the engine test bed equipments (for example, gas analysis cabinet (BAG), smoke meter (AF) for fumes opacity analysis and fuel consumption balance (BCC)). Acquisition of the state of the system through these heterogeneous interfaces (acquisition cards, digital links, field bus, etc.) is controlled by independent modules. The drivers provide:
control of the engine set points performed by output electronic shaping and power stages (IEMF);
control of the set points of the engine test bed equipments performed by a digital communication with these equipments (MCN): range selection, bucket filling, etc.;
control and regulation of the brake (or of the generator) achieved by the electronic I/O interfaces (IEE and IEMF) and/or a specific digital communication (MCN); and
automation and definition of the engine test sequences are intrinsic to the supervision software (STR). The configurations of the engine tests are performed in the form of job objects (consumption balances, automatons, normalized cycles, etc.) that are configured once and reusable. These objects support inheritance and polymorphism: the same application can run without modification on test beds fitted with equipments of very different types,
control and centralization of the engine test bed safeties are performed by a digital communication with the test bed automaton (AUT).

According to the particular embodiment of the engine test bed supervision system comprising an engine control system, the supervision system can automatically generate codes from a MATLAB®/Simulink® type platform. Owing to its very open architecture, all the functionalities of the system can be extended very simply, without modifying or even recompiling the existing code. Thus, the driver and vehicle models, as well as algorithms, can go from a MATLAB®/Simulink® type platform to the test bed within a few minutes.

Furthermore, the supervision system (SS) allows:
mathematical calculations (in real time) with support of the vectors, tables and maps;
monitoring of the alarm and consequent reactions on all the channels of the system (including calculations) with each channel having any number of alarms whose thresholds can be very complex formulas;
multitask control of the process by a true real-time macro language extensible by the drivers and making the use of automatons needless, except for vital safeties;
manual and automatic multi-frequency data storage; and
multi-thread graphical displays and animations optimized for real time.

The supervision system (SS) according to the invention thus allows real-time supervision, control and acquisition, at frequencies up to 10 kHz (unlimited channels), of the state of the system. Its field of use ranges from conventional supervision to test beds to the supervision of a set of platforms and engine control.

The invention claimed is:

1. A system for real-time acquisition and control of engine test beds, comprising:
   a computer platform;
   a software operating environment; and
   an associated real-time module, including a file comprising descriptions of equipments and drivers associated with engine test beds, software drivers for controlling engine test bed equipments independently of the software operating environment and of the computer platform, an editor for test configurations defined by engine test acquisition and control conditions with the test configurations being independent of the software drivers and of the engine test bed equipments, and real-time supervision software for reading information from the file comprising descriptions in charge of real-time execution of the test configurations from the editor by loading of required software drivers; and wherein
   the software drivers for controlling engine test bed equipments communicate in real time with the real-time supervision software.

2. An acquisition and control system as claimed in claim 1, wherein a test configuration edited by the editor is defined by generic engine test bed functions.

3. An acquisition and control system as claimed in claim 2, wherein the description file is in XML format.

4. An acquisition and control system as claimed in claim 3, wherein the test configuration editor uses XML format schemas.

5. An acquisition and control system as claimed in claim 4, wherein the system comprises an engine control system.

6. An acquisition and control system as claimed in claim 3, wherein the system comprises an engine control system.

7. An acquisition and control system as claimed in claim 2, wherein the test configuration editor uses XML format schemas.

8. An acquisition and control system as claimed in claim 7, wherein the system comprises an engine control system.

9. An acquisition and control system as claimed in claim 2, wherein the system comprises an engine control system.

10. An acquisition and control system as claimed in claim 1, wherein the description file is in XML format.

11. An acquisition and control system as claimed in claim 10, wherein the test configuration editor uses XML format schemas.

12. An acquisition and control system as claimed in claim 11, wherein the system comprises an engine control system.

13. An acquisition and control system as claimed in claim 10, wherein the system comprises an engine control system.

14. An acquisition and control system in accordance with claim 10, wherein the engine test bed conducts study of internal combustion engines.

15. An acquisition and control system as claimed in claim 1, wherein the test configuration editor uses XML format schemas.

16. An acquisition and control system as claimed in claim 15, wherein the system comprises an engine control system.

17. An acquisition and control system in accordance with claim 15, wherein the engine test bed conducts study of internal combustion engines.

18. An acquisition and control system as claimed in claim 1, wherein the system comprises an engine control system.

19. An acquisition and control system as claimed in claim 18, wherein the engine control system comprises a module providing automatic generation of an engine control driver for coupling an engine with the software.

20. An acquisition and control system as claimed in claim 19, wherein the automatic engine control driver generation module comprises:
   an engine control model generation module; and
   an engine control model compiler module.

21. An acquisition and control system as claimed in claim 20, wherein the computer platform shares processor resources between engine test bed supervision tasks and interpretation tasks of the engine control driver.

22. An acquisition and control system in accordance with claim 21, wherein the engine test bed conducts study of internal combustion engines.

23. An acquisition and control system in accordance with claim 20, wherein the engine test bed conducts study of internal combustion engines.

24. An acquisition and control system as claimed in claim 19, wherein the computer platform shares processor resources between engine test bed supervision tasks and interpretation tasks of the engine control driver.

25. An acquisition and control system in accordance with claim 24, wherein the engine test bed conducts study of internal combustion engines.

26. An acquisition and control system in accordance with claim 19, wherein the engine test bed conducts study of internal combustion engines.

27. An acquisition and control system in accordance with claim 18, wherein the engine test bed conducts study of internal combustion engines.

28. An acquisition and control system in accordance with claim 1, wherein the engine test bed conducts study of internal combustion engines.

* * * * *